Feb. 9, 1926.　　　　　　　　　　　　　　　　　1,572,812
E. S. G. REES
PROPULSION AND MANEUVERING OF SHIPS AND AIRCRAFT
Filed Sept. 8, 1922　　　5 Sheets-Sheet 1
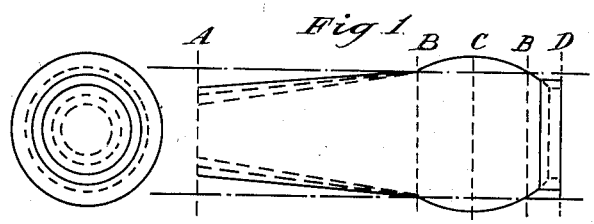
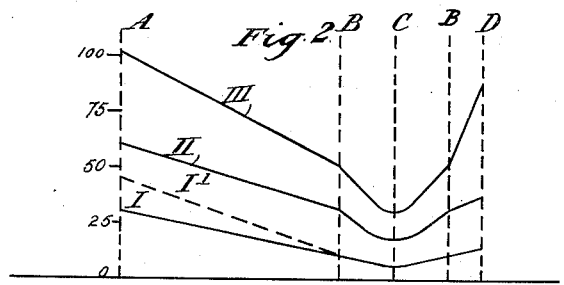
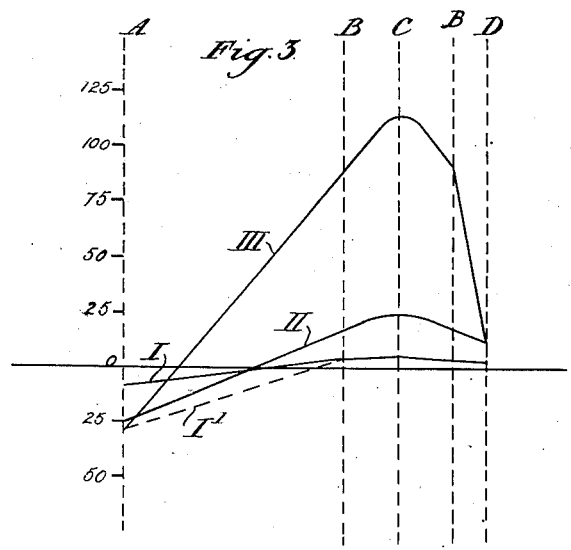
Inventor
Edmund S. G. Rees
By
Attorney Feb. 9, 1926.
1,572,812
E. S. G. REES
PROPULSION AND MANEUVERING OF SHIPS AND AIRCRAFT
Filed Sept. 8, 1922   5 Sheets-Sheet 2
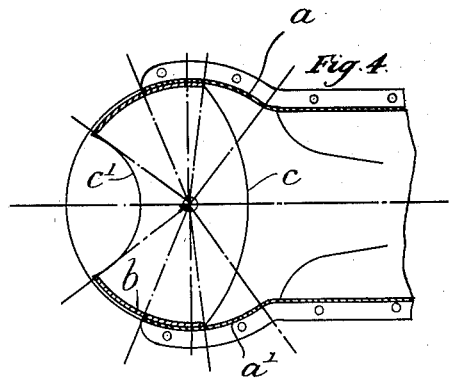
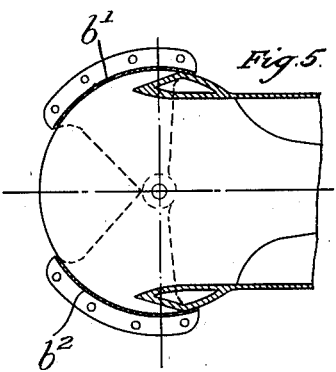
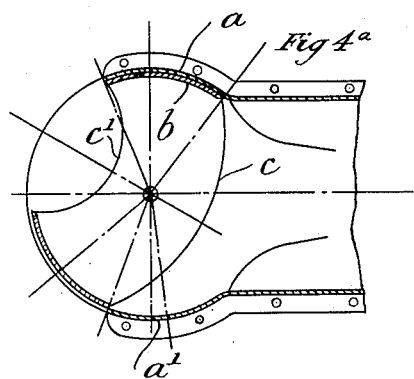
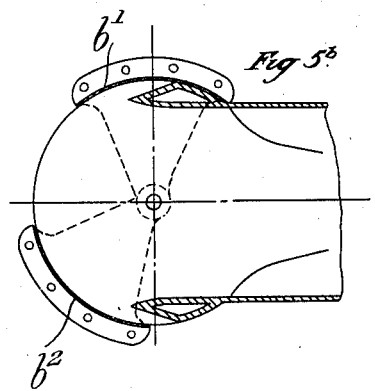
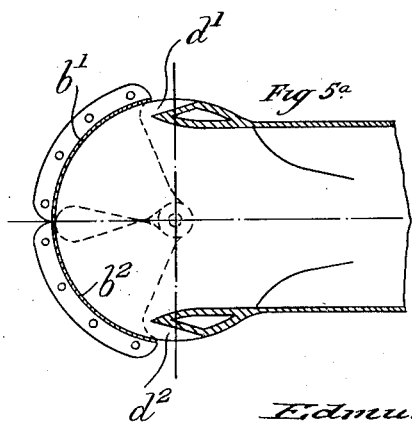
Inventor
Edmund S. G. Rees
By
Attorney

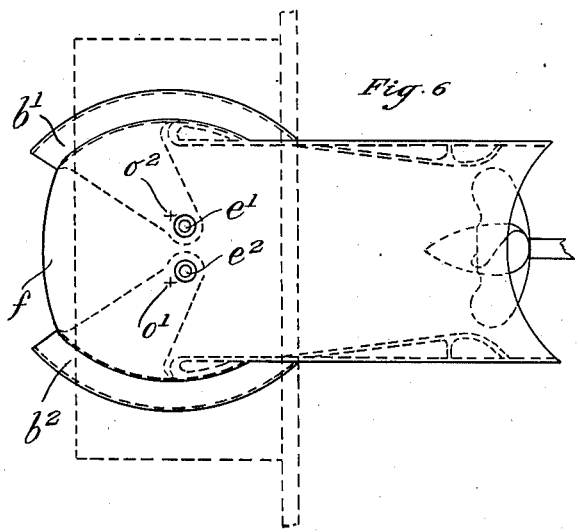
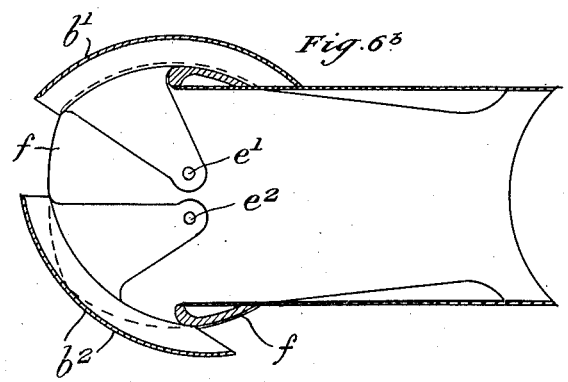

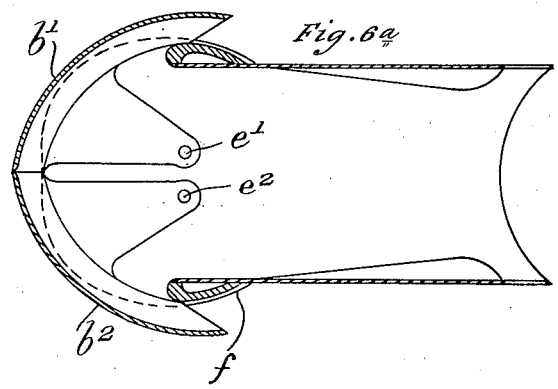
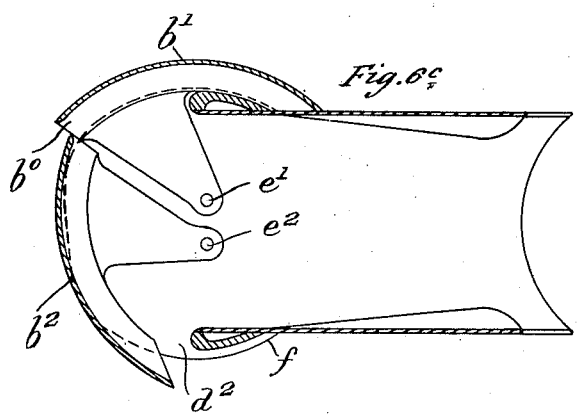

Feb. 9, 1926. 1,572,812
E. S. G. REES
PROPULSION AND MANEUVERING OF SHIPS AND AIRCRAFT
Filed Sept. 8, 1922 5 Sheets-Sheet 5
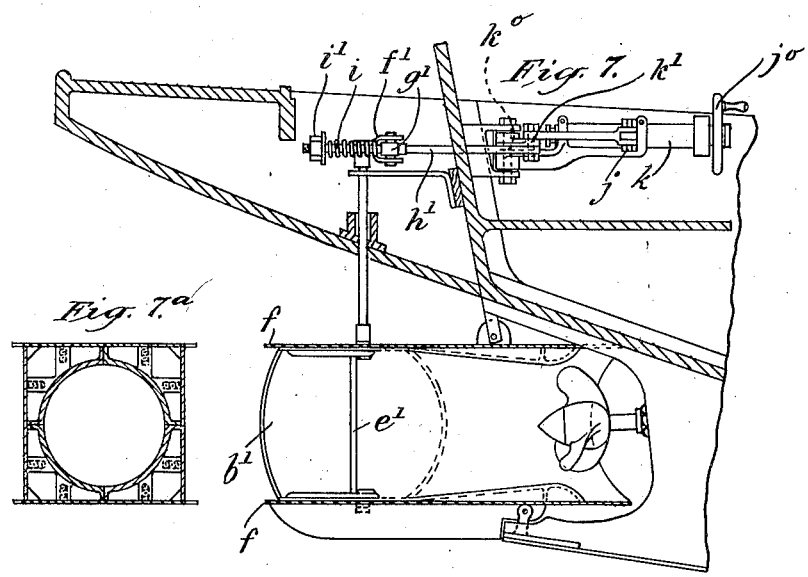
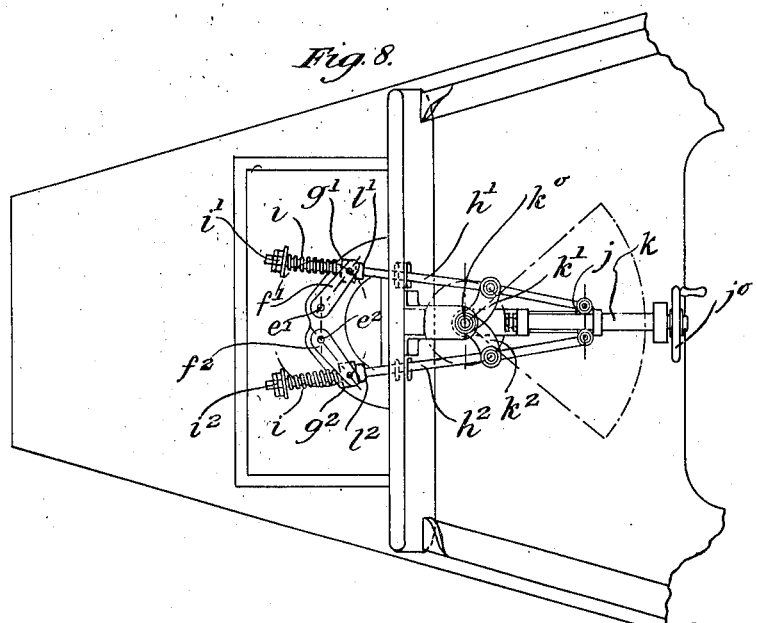
Inventor
Edmund S. G. Rees
By
Attorney Patented Feb. 9, 1926.

1,572,812

UNITED STATES PATENT OFFICE.

EDMUND SCOTT GUSTAVE REES, OF WOLVERHAMPTON, ENGLAND.

PROPULSION AND MANEUVERING OF SHIPS AND AIRCRAFT.

Application filed September 8, 1922. Serial No. 586,949.

*To all whom it may concern:*

Be it known that I, EDMUND SCOTT GUSTAVE REES, a subject of the King of Great Britain, residing in Wolverhampton, England, have invented certain new and useful Improvements in the Propulsion and Maneuvering of Ships and Aircraft, of which the following is a specification.

This invention relates to ships driven by screw propellers and to airships and areoplanes, and to vessels propelled on the surface of the water by air propellers, and in particular it relates to the apparatus effecting the propulsion and maneuvering of such craft.

It has already been proposed by the present applicant to provide immediately in rear of each driving propeller a fixed tube or duct open at its forward end, except in so far as it is closed by the propeller, and open also at its rear end, except in so far as it may be closed by means of a pair of pivoted vanes or pallets independently or conjointly movable in the same or opposite senses. Such apparatus has been described in British patent specifications Nos. 124,047, 141,445 and 159,927. One of the theoretical results of a fixed tube or diffuser which flares from the front or propeller end to the rear end, sometimes called an augmenter tube in the aforesaid specifications, is to reduce the pressure immediately in rear of the propeller and thus promote an increased flow and velocity of fluid (water or air) through the tube past the propeller and thereby enable the propeller to run, without producing cavitation, either at a higher speed or at the same speed with a greater pitch of screw.

One of the principal objects of the present invention is to recover as far as practicable the speed energy of the fluid stream and apply it to assist in the propulsion of the vessel, and this is effected by the conversion of the velocity of the propeller-energized stream into pressure within the augmenter tube and its re-conversion into velocity of a lower order by ejection through one or more discharge nozzles or orifices of considerable area at the rear end of the augmenter tube which thus becomes a pressure chamber containing a considerable volume of fluid at a positive pressure discharging rearwardly into the external surrounding fluid, thus imparting a forward impulse to the fixed tube and consequently to the vessel. The means for propulsion may, therefore, be regarded as a combination of ordinary screw propulsion and auxiliary jet propulsion arranged in series. For the highest efficiency the area of the rearward discharge orifice or orifices is designed to give a discharge velocity only moderately greater than the speed of the vessel relative to the surrounding fluid.

While the pressure chamber may be regarded as a means of recovering energy from the propeller-energized stream which would otherwise be lost and utilizing it for the production of an auxiliary propulsive effort, the extent to which the stream energy can be usefully employed for this purpose will vary with different classes of craft, and in the case of slow moving vessels this auxiliary effort may approximate to zero with the maneuvering pallets fully open, i. e. in position for maximum speed ahead, but even in such cases the double transformation of velocity into pressure and pressure into velocity at the end of the draft or augmenter tube involves the establishment of a pressure within that region higher than that of the surrounding fluid which seals the end of the draft tube and maintains a condition of hydraulic stability enabling the draft tube to fulfil its intended function under the varying relative speeds and movements of the tube and the surrounding fluid.

For example, in the case of a surface ship driven by a submerged propeller, if the conditions of speed and the sternward flare of the draft or augmenter tube are more than is necessary to create a vacuum of, say, 30 feet of water in rear of the propeller, the surplus energy of the propeller-energized stream can be recovered to a greater or less extent by means of the pressure chamber and rearward discharge nozzle or nozzles, and usefully applied to the production of an auxiliary propulsive effort; but until such a vacuum is produced the value of the conversion of the speed energy into excess pressure before discharge from the rear end of the draft tube resides mainly in its sealing or stabilizing effect.

Concretely stated, therefore, the invention, as distinguished from arrangements described in previous specifications, may be regarded as centering in the provision of a pressure chamber at the rear end of the draft or augmenter tube adapted to raise the pressure of the fluid within the chamber to a value higher than the pressure of the surrounding fluid when the maneuvering pallets are fully open.

The rearwardly discharging nozzle (and for convenience of description it will be assumed that there is only one screw propeller, one augmenter tube and one rearward nozzle and that the vessel to be propelled is a ship driven by a submerged propeller) is preferably so constructed that the discharge jet can be directed not only straight astern but also to port and starboard to any desired extent to effect the steering and dispense with rudders in the ordinary sense.

In the drawings, Fig. 1 shows diagrammatically in side and end elevation a draft or augmenter tube and Figs. 2 and 3 are velocity and pressure diagrams illustrating the principle of the present invention when such a tube is used submerged in water. In Fig. 1 the full line outline shows a draft or augmenter tube with a ratio of expansion between B and A of 2 to 1, the dotted lines between A and B showing expansion ratios of 3 to 1 and 4½ to 1 respectively. The letter A represents the plane of maximum velocity of the propeller-energized stream, the letter B represents the planes at which the rearward stream has a velocity equal to the forward speed of the tube through the water, C represents the plane of maximum pressure, that is of maximum section of the pressure chamber, and D represents the plane of the discharge nozzle at which the water leaves the tube, the area of the nozzle being less than the area on planes B, B by an amount depending on speed and other conditions.

In the velocity diagram of Fig. 2 the curves show the velocities (proportional to the ordinates) at different parts of the draft tube under varying conditions of speed and ratio of expansion. Curve I gives the velocity for a surface boat travelling at 6 knots with an augmenter tube having a ratio of expansion between B and A of 3 to 1 submerged to a depth of 2 ft. below the surface of the water. The curve I' shows the change in the velocity diagram which is brought about by altering the expansion ratio of the tube to 4½ to 1. In the curves II and III the tubes have a ratio of expansion of 2 to 1, but curve II applies to a boat travelling at a speed of 18 knots and curve III to a boat travelling at a speed of 30 knots, the draft tube in each case being 10 ft. below the surface, but the discharge opening in the case of curve III is constricted as indicated by the dotted lines in Fig. 1, to a size which reduces the vacuum in rear of the propeller to a practical value.

In the pressure diagram of Fig. 3 in which the ordinates represent head or pressure in feet, the several curves are indicated by the same numerals as the corresponding velocity curves of Fig. 2. It will be seen from the curves of Figs. 2 and 3 that the discharge nozzle of the pressure chamber at the tail end of the augmenter tube is constricted to such an extent that with the expansion ratio of the augmenter tube employed the vacuum established in rear of the propeller by the action of the augmenter tube is approximately 30 feet of water, except in the case of the 6 knots vessel which, with a draft tube having an expansion ratio of 3 to 1, gives a vacuum of say 10 feet. In this case it is found necessary to employ an expansion ratio of 4½ to 1 in order to start with what may be regarded as the standard vacuum on the plane A.

In these diagrams no consideration has been given to the approach of the fluid to the entrance of the expanding or draft tube on the plane A, nor to hydraulic or frictional losses, nor to the practical possibility of inducing the higher velocities in water in front of the impeller at the submersions specified. The diagrams are only intended to show in the most convenient manner the relative effects of diffuser and pressure chamber under different speed conditions of tube and fluid. It is to be understood, however, that any known form of contracting entry to the draft tube to give increased efficiency of propulsion (some forms of which are shown in the previously cited specifications by the present applicant) may be used in conjunction with the present invention.

Various forms of draft tubes embodying the present invention are illustrated in the drawings, Figs. 4 and 4ª being sectional plans of one form with the discharge jet directed in different ways; Figs. 5, 5ª and 5ᵇ are similar views of another form in which the walls of the pressure chamber are constituted by the maneuvering pallets, these being shown in different positions in the several figures; and Figs. 6, 6ª, 6ᵇ, 6ᶜ show a further modification with the pallets in different positions, the pallets in this case being sections of a sphere instead of a cylinder; Fig. 7 is a vertical section through the stern of a ship fitted with a draft tube such as shown in Fig. 6; Fig. 7ª is a cross section through the tube showing constructional details; and Fig. 8 is a plan view of Fig. 7 showing an arrangement of steering gear for manipulating the pallets.

In the case of an augmenter tube of internal circular section at the forward end where it closely encircles the propeller, merging into a tube of square section towards its rear end, the side walls of the square tail end (Figs. 4, 4ª) may be bent into arcs $a$, $a'$ having a common centre within or upon which there is rotatably mounted a section $b$ of a cylinder having its axis at right angles to the axis of the draft tube, the wall of which is cut away at its forward end $c$ to give an aperture not less than that of the square part of the augmenter tube and similarly cut away at its rear end $c'$ to provide a discharge nozzle of appropriate area; this cylindrical section being rotatable about the common centre of curvature by any suitable tiller mechanism so as to discharge the water from the pressure chamber in any desired direction, e. g. astern as in Fig. 4 and to port as in Fig. 4ª.

Should it be desirable to provide for the discharge in any direction in any plane, as might be the case in submarine or aircraft maneuvering, the tail section of the augmenter tube or pressure chamber, both fixed and movable portions, might be spherical instead of cylindrical, means being provided to turn the nozzle portion so that the jet may be discharged in any direction except forwardly.

Instead of the nozzle being of fixed area, as shown in Figs. 4 and 4ª, the movable cylindrical or spherical section may be made in two parts $b'$, $b^2$ (Figs. 5, 5ª and 5ᵇ) provided with suitable means for swinging them and for simultaneously adjusting them relatively to each other so as to vary the discharge aperture.

Figs. 5 and 5ᵇ show the segments $b'$, $b^2$ fully open, the former in the position for full speed ahead, and the latter for going to port; while Fig. 5ª shows the two segments closed on each other for going astern.

Further, when the discharge aperture is so formed, it may be arranged that when the aperture is reduced to an extent considerably beyond that at which maximum propulsive effect is obtained, forwardly directed nozzles are thereby uncovered as at $d'$, $d^2$ (Fig. 5ª) in the fixed part of the tail section through which the water in the pressure chamber is in part discharged, thereby promoting the retarding effect on the ship and by these means a condition may be attained such that with the propeller running at full speed ahead the ship may remain stationary, or when the discharge aperture is closed still further the ship will go astern.

For maneuvering purposes, however, apart from the auxiliary propulsive effect obtained by the pressure chamber and rearwardly discharging nozzle, it is preferred to mount the two cylindrical or spherical segments $b'$, $b^2$ which constitute the variable aperture discharge nozzle so that they are rotatable upon different axes, e. g. upon the pintles $e'$, $e^2$ (Figs. 6–8), which are so related with respect to each other and the common axis of the imaginary sphere of which the segments form part when they are in the position for maximum propulsive effect, that when swung to either side with reduced aperture as in Fig. 6ᶜ the direction of the jet from this aperture $b^0$ and that of the jet from the uncovered forward aperture $d^2$ will tend to turn the vessel in the same direction. In other words, when the spherical segments are together swung to port, as in Fig. 6ᶜ, their rear edges will assume positions resulting in a nozzle $b^0$ directed towards starboard, and conversely. In this construction there is not necessarily a fixed portion of the pressure chamber, the rotatable segments $b'$, $b^2$ constituting the end of the chamber in conjunction with circular disc extensions $f$ of the top and bottom walls of the augmenter tube. Although the swinging segments $b'$, $b^2$ are shown in these figures (6–8) as segments of a sphere, they may alternatively be segments of a cylinder.

The relation of the forward edges of the cylindrical or spherical segments and the side walls of the tube is such that when the discharge aperture between the rear edges is adjusted for maximum propelling effect as in Fig. 5 there are no apertures between the forward edges and the tube walls, and preferably also the relation is such that each segment, e. g. segment $b'$ in Fig. 5ᵇ, may be swung backwards a certain distance beyond the correct aperture for full speed ahead before it is arrested by the wall of the tube.

In the construction of Figs. 6–6ᶜ the spherical segments $b'$, $b^2$ are struck from different centres, viz $o'$, $o^2$ respectively, as well as pivoted eccentrically upon the pins $e'$, $e^2$.

Suitable gear for operating the segments includes means for rotating them about their axes simultaneously in opposite directions for opening and closing the discharge nozzle and for swinging them simultaneously in the same direction, the linkage of the gear being such as to permit either segment to continue its swing in one direction when the other segment is arrested by contact with the fixed part of the pressure chamber or tube.

Such a gear is shown in Figs. 7 and 8 applied to curved pallets such as $b'$, $b^2$ having different axes. The pivot pins $e'$, $e^2$ of these pallets have arms $f'$, $f^2$ rigidly secured to them, and the outer ends of these arms carry swivelling blocks $g'$, $g^2$ through which rods $h'$, $h^2$ are arranged to slide, springs $i$ normally in compression being interposed between the blocks $g'$, $g^2$ and abutments such as the nuts $i'$, $i^2$ on the rear ends of the rods. The forward ends are pivotally attached to a threaded block or nut $j$ which by means of a hand wheel $j^0$ operating a screwed rod journalled in the tiller $k$ can be traversed along the tiller $k$. The tiller is rotatable about a post $k^0$ which is pivotally connected with the rods $h'$, $h^2$ at intermediate points of their length by links $k'$, $k^2$.

In the position of the parts shown in Fig. 8, when the tiller $k$ is swung to port a stop or collar $l'$ on rod $h'$ engaging the swivelling block $g'$ thrusts the outer end of the arm $f'$ and turns the pivot pin $e'$ counter-clockwise. The pivot pin $e^2$ is simultaneously turned counter-clockwise through the spring $i$ on rod $h^2$ engaging block $g^2$. The curved pallets are thus swung to starboard, and it will be seen that after the forward edge of pallet $b^2$ has been arrested by contact with the wall of the augmenter tube, the yielding of the spring or rod $h^2$ will permit the pallet $b'$ to continue its swinging movement to starboard. The operation of the hand wheel $j^0$ turns the pivots $e'$, $e^2$ in opposite directions and thus opens or closes the rear edges of the pallets with respect to each other.

The draft or augmenter tube shown in Figs. 6–8 has a bore which flares both forwardly and rearwardly from the plane of maximum constriction, in front of which plane the propeller is preferably situated, and the transverse section of the bore of the tube at its throat or central part is circular, merging into front and rear portions which are square in section. The rear section of the tube is made square for co-operation with the swinging pallets, and the forward section is preferably square so as to afford simple and convenient means for reducing the resistance of the tube by boxing in its irregular contour within flat plates, as shown more particularly in Fig. 7ª, corner ribs being introduced between the outside of the tube and these plates as therein shown.

It will be understood that the particular constructions of augmenter tubes, pressure chamber and discharge nozzle hereinbefore described, although forming part of the present invention, may be varied in many respects without departing from the invention in its widest aspect, which may be regarded as a submerged centrifugal or screw pump having an impeller with an unbalanced thrust operating in free water or other fluid and a pressure chamber discharging into the lower pressure of the surrounding fluid.

Having thus described the nature of the said invention and the best means I know of carrying the same into effect, I claim:—

1. In the propulsion and maneuvering of ships and aircraft, the combination of a rearwardly-flaring augmenter or draft tube situated immediately in rear of the propeller, and a pressure chamber at the rear end of the said tube increasing in cross-sectional area from said tube to a point intermediate its length and then decreasing to its discharge outlet, said pressure chamber being adapted to raise the pressure of the fluid stream within the chamber to a value greater than that of the surrounding fluid.

2. Propelling and steering mechanism for ships and aircraft, comprising a fixed open-ended tube having a contracting inlet portion and an expanding augmenter or diffuser portion, a propeller within the tube and coaxial therewith located in front of the point of maximum constriction, and a pressure chamber at the rear end of the said tube increasing in cross-sectional area from its junction with the tube to a point intermediate its length and decreasing therefrom to its discharge outlet.

3. Propelling and steering mechanism for ships and aircraft, comprising a fixed open-ended draft tube of externally rectangular form having a throat of circular section and a rear portion of rectangular bore into which said throat merges, and a pressure chamber at the end of the said rear portion having a discharge opening the maximum cross-sectional area of which is less than that of the rear portion of the said draft tube.

4. Propelling and steering mechanism for ships and aircraft, comprising a fixed draft tube in rear of the propeller, and a pressure chamber at the rear end of said tube, said pressure chamber having a directable discharge outlet having a maximum area less than the area of the rear end of the said draft tube.

5. Propelling and steering mechanism for ships and aircraft, comprising a propeller, a fixed draft tube in rear of the propeller, a pressure chamber forming a continuation of said draft tube and pivotally mounted segments curved with respect to an axis at right angles to the axis of the said draft tube, said segments constituting parts of the walls of said pressure chamber.

6. Propelling and steering mechanism for ships and aircraft, comprising a propeller, a fixed draft tube in rear of the propeller and a pressure chamber forming a continuation of said draft tube and having walls constituted in part by pivotally mounted spherical segments.

7. Propelling and steering mechanism for ships and aircraft, comprising a fixed draft tube terminating in a pressure chamber having walls constituted in part by pivotally mounted curved segments and means for swinging said segments either in opposite senses or in the same sense, said means comprising a tiller, rods pivotally connected with a fixed part and with the pivot pins of the curved segments and a block with which the said rods are pivotally connected traversable along the tiller.

In testimony whereof I have signed my name to this specification.

EDMUND SCOTT GUSTAVE REES.